April 27, 1937.

R. HAFNER 2,078,663

CONTROL LEVER FOR AIRCRAFT, OR SIMILAR ROCKING
LEVER DEVICES IN CONTROL MECHANISMS
Filed Nov. 30, 1934

Raoul Hafner
INVENTOR
his ATTY.

Patented Apr. 27, 1937

2,078,663

UNITED STATES PATENT OFFICE 2,078,663

CONTROL LEVER FOR AIRCRAFT, OR SIMILAR ROCKING LEVER DEVICES IN CONTROL MECHANISMS

Raoul Hafner, Vienna, Austria

Application November 30, 1934, Serial No. 755,266
In Great Britain January 1, 1934

4 Claims. (Cl. 74—491)

The present invention relates to control levers and more particularly to the control levers or "joy-sticks" of aircraft, which comprise a relatively long arm for operation by the pilot and are connected with the members to be controlled at relatively short leverage from the fulcrum.

It is well-known that a continuous load is thrown upon the pilot's hand in many forms of aircraft if the machine is out of balance in any way, or any of the control surfaces are unbalanced. This induces fatigue and in certain cases limits the control efforts which the pilot is able to exert upon the machine. This statement particularly applies to aircraft having controlled rotative wing systems either freely rotative or power driven.

The primary object of the present invention is to provide a control lever such that when put into any definite position by the pilot, reaction from the controlled members will not cause reverse movement or will react with only slight force at the end of the long arm.

According to this invention a control lever of the kind above mentioned is provided with a cylindrical or spherical fulcrum mounted between opposing pairs of wedge-disposed journal surfaces so that reaction pressure from the controlled members, considered as tending to turn the lever about a fulcrum constituted by the end of the long arm held by the pilot, will set up a strong wedging action and friction which will hold or assist in holding the lever against reverse movement about the fulcrum proper. If the control lever is required to have only a rocking motion, the fulcrum consists of a pair of cylindrical segments mounted upon the control lever and the journal of two pairs of opposing wedge-like bearing strips. On the other hand if the control lever is required to have a universal motion, the fulcrum consists of two segments of a sphere mounted upon the control lever and the journal of two annular and opposite bearing surfaces mounted around the said control lever.

The invention will now be described with reference to the accompanying drawing, wherein:—

A universally moving joy-stick or control lever 1 is provided with two segments 2 of a sphere which together form the fulcrum of the lever about the centre 3 of the spherical surfaces.

Figure 1:
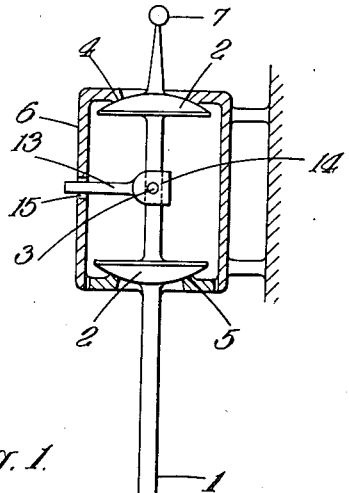
Figure 1 shows the control lever in side elevation with the journal in cross section.
Figure 2:
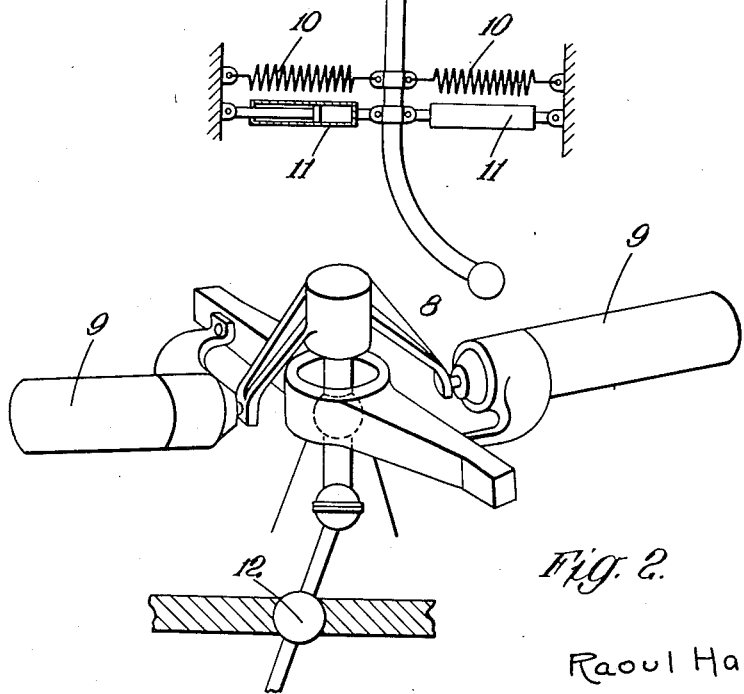
Figure 2 shows in skeleton form the method of fitting the control lever to the control mechanism of a rotative wing system.

The segments 2 are engaged by fixed annular spherically shaped bearing rings 4, 5 mounted in the fixed journal casing 6. The bearing ring 5 is adjustably mounted within the journal casing 6 so that any desired frictional pressure may be placed upon the bearing surfaces. The upper end of the lever 1 is provided with a ball end 7 at short radius from the centre 3 which engages with the control mechanism 8 of a rotative wing system machine having adjustable flapping blades 9. In Figure 2 the circle 12 is intended to indicate the universally movable fulcrum of Figure 1.

The lower end of the control lever 1 is provided with a number of radially disposed springs 10 for centralizing the lever when the pilot ceases to bear thereon, and is also provided with a number of radially disposed dash-pots 11 to damp out rapid motions of the lever 1.

Rotation of the control lever 1 is prevented by a forked link 13 pivoted at 14 thereto and passing through a hole 15 in the side of the casing 6.

Although the invention has been described as relating to control levers or "joy-sticks" for aircraft, it will be understood that it is equally applicable to any similar rocking lever device in a control mechanism.

I claim:—

1. In combination with a control lever having a long arm and a short arm, a pivotal fulcrum mounting therefor comprising cooperating inner and outer bearing members of which one is fixed and the other is rockable and mounted on said arms, the bearing contact between said members being confined to surfaces lying at large mean angles to the axis of said short arm, whereby a lateral impact load on said short arm, being applied adjacent to said rockable bearing member, will urge said member laterally into wedged relationship with said fixed bearing member to prevent angular movement of said lever under such load.

2. A control lever as claimed in claim 1, including means cooperating with said lever to restore the latter to its central position when released.

3. A control lever as claimed in claim 1, including a dash-pot means associated with the lever for damping out rapid vibrations thereof.

4. A control lever as claimed in claim 1, including means for adjusting the mean bearing pressure between said bearing members.

RAOUL HAFNER.